(12) United States Patent
Li

(10) Patent No.: US 10,659,587 B2
(45) Date of Patent: May 19, 2020

(54) INCOMING CALL MANAGEMENT METHOD AND APPARATUS

(71) Applicants: Zhejiang Geely Holding Group Co., LTD., Hangzhou, Zhejiang Province (CN); Zhejiang Geely Automobile Research Institute Co., LTD., Taizhou, Zhejiang Province (CN)

(72) Inventor: Shufu Li, Hangzhou (CN)

(73) Assignees: ZHEJIANG GEELY HOLDING GROUP CO., LTD., Hangzhou, Zhejiang Province (CN); ZHEJIANG GEELY AUTOMOBILE RESEARCH INSTITUTE CO., LTD., Taizhou, Zhejiang Province (CN)

( * ) Notice: Subject to any disclaimer, the term of this patent is extended or adjusted under 35 U.S.C. 154(b) by 0 days.

(21) Appl. No.: 16/475,125

(22) PCT Filed: Dec. 28, 2017

(86) PCT No.: PCT/CN2017/119282
§ 371 (c)(1),
(2) Date: Jun. 30, 2019

(87) PCT Pub. No.: WO2018/121649
PCT Pub. Date: Jul. 5, 2018

(65) Prior Publication Data
US 2019/0335032 A1    Oct. 31, 2019

(30) Foreign Application Priority Data

Dec. 28, 2017  (CN) .......................... 2016 1 1240178

(51) Int. Cl.
*H04M 1/663*   (2006.01)
*H04M 1/725*   (2006.01)
(Continued)

(52) U.S. Cl.
CPC ....... *H04M 1/663* (2013.01); *H04M 1/27453* (2020.01); *H04M 1/7255* (2013.01); *H04M 3/42059* (2013.01); *H04M 3/436* (2013.01)

(58) Field of Classification Search
CPC ............... H04M 1/663; H04M 1/7255; H04M 1/274508; H04M 3/42059; H04M 3/436; H04M 1/27453
(Continued)

(56) References Cited

U.S. PATENT DOCUMENTS 6,041,103 A    3/2000  La Porta et al.
6,542,596 B1   4/2003  Hill et al.
(Continued)

FOREIGN PATENT DOCUMENTS

CN    1859742 A    11/2006
CN    101217595 A   7/2008
(Continued)

*Primary Examiner* — Mong-Thuy T Tran
(74) *Attorney, Agent, or Firm* — Cheng-Ju Chiang

(57) ABSTRACT

The present disclosure is an incoming call management method, which includes: receiving a call request sent by a calling terminal; determining whether the calling number is stored in an address book corresponding to the called number; if the calling number is stored in the address book, sending the call request to a first called terminal corresponding to the called number to connect to the incoming call; if the calling number is not stored in the address book, configuring the calling terminal to play a preset voice interaction prompt, receiving a voice message sent by the calling terminal; and sending the voice message and the calling number to the first called terminal. The present disclosure also provides an incoming call management apparatus. The present disclosure can initially identify the calling
(Continued)

number through voice message including a calling user attribute and an incoming call reason, so as to improve the user experience.

18 Claims, 6 Drawing Sheets

(51) Int. Cl.
*H04M 3/42* (2006.01)
*H04M 3/436* (2006.01)
*H04M 1/27453* (2020.01)

(58) Field of Classification Search
USPC .......................................... 455/567
See application file for complete search history.

(56) References Cited

U.S. PATENT DOCUMENTS

| | | | |
|---|---|---|---|
| 6,553,109 B1 | 4/2003 | Hussain et al. | |
| 9,203,860 B1* | 12/2015 | Casillas | H04L 63/1433 |
| 9,237,236 B2 | 1/2016 | Yang et al. | |
| 10,110,738 B1* | 10/2018 | Sawant | H04M 3/436 |
| 2006/0206941 A1* | 9/2006 | Collins | H04L 63/1425 |
| | | | 726/25 |
| 2012/0004914 A1* | 1/2012 | Strom | G06F 21/31 |
| | | | 704/246 |
| 2014/0119527 A1* | 5/2014 | Cohen | H04M 3/42059 |
| | | | 379/207.13 |
| 2015/0023485 A1* | 1/2015 | Guarriello | H04M 3/42161 |
| | | | 379/88.23 |
| 2015/0249737 A1* | 9/2015 | Spievak | H04M 3/436 |
| | | | 379/189 |
| 2016/0029188 A1 | 1/2016 | Joels et al. | |
| 2016/0150414 A1* | 5/2016 | Flaks | H04W 12/12 |
| | | | 455/406 |
| 2016/0309024 A1 | 10/2016 | Quilici et al. | |
| 2018/0324297 A1* | 11/2018 | Kent | H04M 3/42042 |

FOREIGN PATENT DOCUMENTS

| | | |
|---|---|---|
| CN | 102917105 A | 2/2013 |
| CN | 104135563 A | 11/2014 |
| CN | 104159229 A | 11/2014 |
| CN | 105376387 A | 3/2016 |
| CN | 105450827 A | 3/2016 |
| CN | 105704324 A | 6/2016 |
| CN | 106657528 A | 5/2017 |
| JP | H10-65817 A | 3/1998 |
| JP | 2007-5961 A | 1/2007 |
| JP | 2007-6467 A | 1/2007 |

* cited by examiner

INCOMING CALL MANAGEMENT METHOD AND APPARATUS

CROSS REFERENCE TO RELATED APPLICATION

The present application is based on and claims priority of Chinese patent application No. 201611240178.9, filed on Dec. 29, 2016. The entire disclosure of the above-identified application is hereby incorporated by reference herein and made a part of this specification.

FIELD OF THE INVENTION

The present disclosure relates to the field of communications technologies, and more particularly to an incoming call management method and apparatus.

BACKGROUND OF THE INVENTION

With the popularization of communication, telephone has become a necessary communication tool for people's daily life. While bringing convenience to people's lives, the phone also bring a lot of trouble. In particular, all kinds of harassing phone calls such as marketing, advertising and fraud have become increasingly rampant and seriously disturb people's daily lives. At the same time, more and more people are accustomed to using the software on the communication terminal such as cell phones for settlement of funds. Once the information is leaked, the resulting loss will be difficult to restore.

Therefore, it has become an urgent technical problem to be solved in the field of communications that how to prevent users from interfering with harassing phone calls without affecting the important incoming calls.

SUMMARY OF THE INVENTION

Therefore, the present disclosure provides an incoming call management method, which can initially identify a calling number through voice message, so as to improve the user experience.

The present disclosure discloses an incoming call management method, which includes: receiving a call request sent by a calling terminal, wherein the call request comprises a calling number and a called number; determining whether the calling number is stored in an address book corresponding to the called number; if the calling number is stored in the address book, sending the call request to a first called terminal corresponding to the called number to connect to the incoming call; if the calling number is not stored in the address book, configuring the calling terminal to play a preset voice interaction prompt, wherein the preset voice interaction prompt comprises at least one of an input prompt of a calling user attribute and an input prompt of an incoming call reason; receiving a voice message sent by the calling terminal; and sending the voice message and the calling number to the first called terminal.

The present disclosure further provides an incoming call management, which includes a request receiving module, a processing module, a control module, a voice receiving module and a first sending module. The request receiving module is configured to receive a call request sent by a calling terminal, wherein the call request includes a calling number and a called number. The processing module is configured to send the call request to a first called terminal corresponding to the called number when the calling number is stored in the address book, so as to connect to the incoming call. The control module is configured to control the calling terminal to play a preset voice interaction prompt when the calling number is not stored in the address book, wherein the preset voice interaction prompt includes at least one of an input prompt of a calling user attribute and an input prompt of an incoming call reason. The voice receiving module is configured to receive a voice message sent by the calling terminal. The first sending module is configured to send the voice message and the calling number to the first called terminal.

According to the incoming call management method and apparatus of the present disclosure, when a calling number is not in an address book, a preset voice interaction prompt including at least one of an input prompt of a calling user attribute and an input prompt of an incoming call reason is displayed so that the user can initially identify the calling number through the voice message, thereby improving the user experience.

The foregoing description is merely an overview of the technical solution of the present disclosure. In order to having a clearer understanding of the technical means of the present disclosure can be implemented in accordance with the contents of the present disclosure and to make the above and other objects, features and advantages of the present disclosure more obvious, the following detailed description will be made with reference to the accompanying drawings, which are described in detail below.

DETAILED DESCRIPTION OF PREFERRED EMBODIMENTS

The technical solutions in the embodiments of the present disclosure are clearly and completely described below with reference to the accompanying drawings in the embodiments of the present disclosure. Apparently, the described embodiments are merely a part but not all embodiments of the present disclosure. All other embodiments obtained by a person of ordinary skill in the art based on the embodiments of the present disclosure without creative efforts shall fall within the protection scope of the present disclosure.

Figure 1:
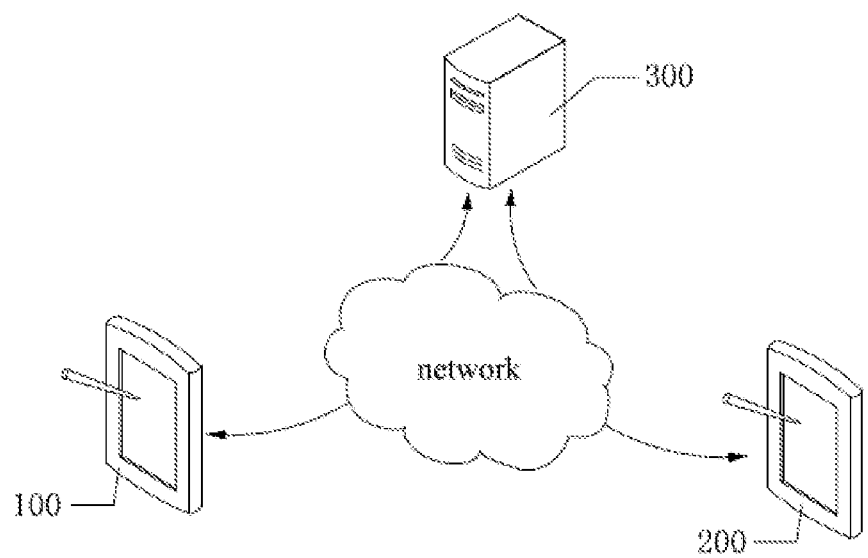
FIG. 1 is an application environment diagram of an incoming call management method according to an embodiment of the present disclosure.

The incoming call management method provided in each embodiment of the present disclosure may be applied to the application environment shown in FIG. 1 to implement incoming call management. As shown in FIG. 1, the application environment includes a calling terminal 100, a first called terminal 200 and a server 300. The calling terminal 100, the first called terminal 200 and the server 300 are located in a wireless network or a wired network. The calling terminal 100, the first called terminal 200 and the server 300 can perform a data exchange through the wireless network or the wired network.

The calling terminal 100 and the first called terminal 200 may be computer terminal devices such as a personal computer (PC), an all-in-one computer, a laptop computer, an in-vehicle terminal and mobile terminal devices such as a smart phone, a smart television, a television box, a tablet computer, an e-book reader, a moving picture experts group audio layer III (MP3) player, a moving picture experts group audio layer IV (MP4) player.

The server 300 may be one server, a server cluster composed of a plurality of servers, or a cloud computing service center.

Figure 2:
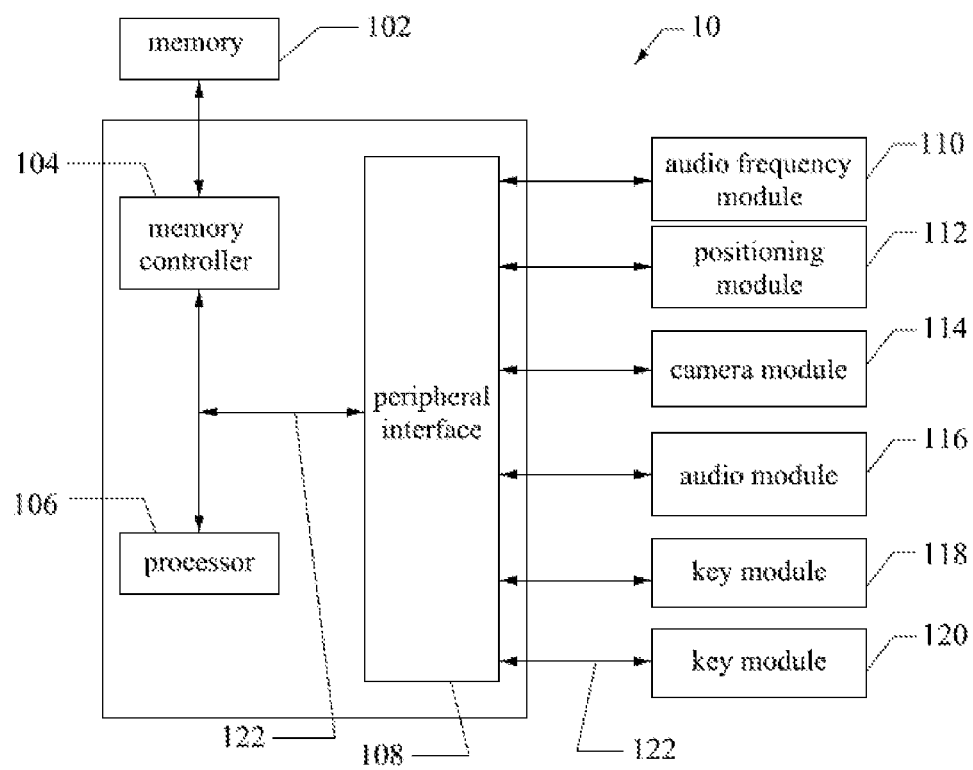
FIG. 2 shows a block diagram of a terminal.

FIG. 2 shows a block diagram of a terminal. The structure shown in FIG. 2 is applicable to the calling terminal 100 and the first called terminal 200. As shown in FIG. 2, the terminal 10 includes a memory 102, a memory controller 104, one or more processors 106 (only one is shown in figure), a peripheral interface 108, a radio frequency module 110, a positioning module 112, a camera module 114, an audio module 116, a screen 118 and a key module 120. These components communicate with each other over one or more communication buses/signal lines 122.

It is understood that the structure shown in FIG. 2 is merely illustrative and the terminal 10 may include more or less components than shown in FIG. 2 or have a different configuration from that shown in FIG. 2. The components shown in FIG. 2 may be implemented in hardware, software, or a combination thereof.

The memory 102 may be configured to store software programs and modules, such as the program instructions/modules corresponding to the incoming call management method and apparatus in the embodiment of the present disclosure. The processor 106 executes the software programs and modules stored in the memory controller 104 to execute various functional applications and data processing, thereby implementing the above incoming call management method and apparatus.

The memory 102 may include high-speed random access memory and may also include non-volatile memory such as one or more magnetic storage devices, flash memories, or other non-volatile solid-state memories. In some embodiments, the memory 102 may further include memories remotely located with respect to the processor 106. The remotely-located memories may be connected to the terminal 10 via a network. Examples of above networks include, but are not limited to, the Internet, intranets, local area networks, mobile communication networks, and a combination thereof. Access by the processor 106 and other possible components to the memory 102 may be performed under the control of the memory controller 104.

The peripheral interface 108 couples various inputs/input devices to the CPU and the memory 102. The processor 106 runs various software and instructions within the memory 102 to execute various functions of the terminal 10 and perform data processing.

In some embodiments, the peripheral interface 108, the processor 106 and the memory controller 104 may be implemented in a single chip. In other embodiments, they can be implemented by separate chips.

The radio frequency module 110 is configured to receive and transmit electromagnetic waves and realize mutual conversion of electromagnetic waves and electric signals to communicate with a communication network or other devices. The radio frequency module 110 may include various existing circuit elements for performing these functions such as an antenna, a radio frequency transceiver, a digital signal processor, an encryption/decryption chip, a subscriber identity module (SIM) card, a memory, and the like. The radio frequency module 110 can communicate with various networks such as the Internet, an intranet, a wireless network or other devices through a wireless network. The above wireless network may include a cellular telephone network, a wireless LAN or a metropolitan area network. The above wireless network may use various communication standards, protocols and technologies including, but not limited to, global system for mobile communication (GSM), enhanced data GSM environment (EDGE), wideband code wideband code division multiple access (W-CDMA), code division access (CDMA), time division multiple access (TDMA), Bluetooth, wireless fidelity (Wi-Fi) (such as the Institute of Electrical and Electronic Engineers standards IEEE 802.11a, IEEE 802.11b, IEEE 802.11g and/or IEEE 802.11n), voice over internet protocol (VoIP), worldwide interoperability for microwave access (Wi-Max), other protocols for mails, instant messages and short messages, as well as any other suitable communication protocols, and may even include those that are not currently developed.

The positioning module 112 is configured to obtain the current location of the terminal 10. Examples of positioning module 112 include, but are not limited to, global positioning satellite system (GPS) and the positioning technology based on wireless local area network or mobile communication network.

The camera module 114 is configured to take a photo or video. The captured photo or video may be stored in the memory 102 and may be transmitted by the radio frequency module 110.

The audio module 116 provides an audio interface to the user. The audio module 116 may include one or more microphones, one or more speakers and an audio circuitry. The audio circuit receives sound data from the peripheral interface 108, converts the sound data into electrical information, and transmits the electrical information to the speaker. The speaker converts electrical information into sound waves that the human ear can hear. The audio circuit also receives electrical information from the microphone, converts the electrical signal to sound data, and transmits the sound data to the peripheral interface 108 for further processing. Audio data may be obtained from the memory 102 or through the radio frequency module 110. In addition, the audio data may also be stored in the memory 102 or transmitted by the radio frequency module 110. In some embodiments, the audio module 116 may also include a headphone jack for providing an audio interface to a headset or other device.

The screen 118 provides an output interface between the terminal 10 and the user. Specifically, the screen 118 displays the video output to the user. The contents of the video output may include text, graphics, video, and any combination thereof. Some output results correspond to some user interface objects. It is understood that the screen 118 may further include a touch screen. The touch screen provides an output and input interface between the terminal 10 and the user at the same time. In addition to displaying the video output to the user, the touch screen also receives user input such as user's click, swipe and other gesture operations so that the user interface object responds to the user's input. The technique of detecting user input may be based on resistive, capacitive or any other possible touch detection technique. Specific examples of the touch screen display unit include, but are not limited to, a liquid crystal display or a light emitting polymer display.

The key module 120 also provides an interface for the user to input to the terminal 10. The user can press the different keys to make the terminal 10 perform different functions.

Figure 3:
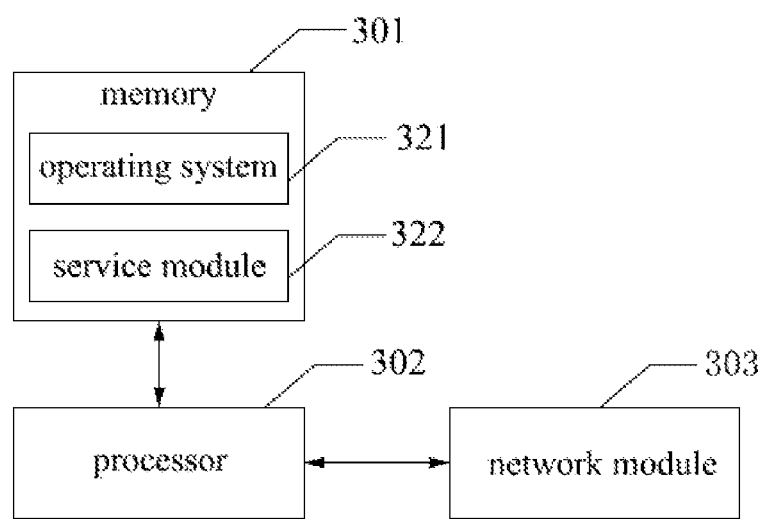
FIG. 3 shows a block diagram of a server.

FIG. 3 shows a block diagram of a server. As shown in FIG. 3, the server includes a memory 301, a processor 302 and a network module 303.

It is understood that the structure shown in FIG. 3 is merely illustrative, and the server may include more or fewer components than shown in FIG. 3 or have a different configuration from that shown in FIG. 3. The components shown in FIG. 3 may be implemented in hardware, software, or a combination thereof. In addition, the server in the embodiment of the present disclosure may further include a plurality of servers with different specific functions.

The memory 301 may be configured to store software programs and modules, such as the program instructions/modules corresponding to the incoming call management method and apparatus in the embodiments of the present disclosure. The processor 302 executes various functional applications and data processing by running the software programs and modules stored in the memory 301, thereby implementing the incoming call management method and apparatus in the embodiments of the present disclosure. The memory 301 may include a high-speed random access memory and may also include non-volatile memory such as one or more magnetic storage devices, flash memories, or other non-volatile solid-state memories. In some examples, the memory 301 may further include a memory remotely located with respect to the processor 302. The remotely-located memory may be connected to the server via a network. Further, the above software programs and modules may further include an operating system 321 and a service module 322. The operating system 321 may be, for example, LINUX, UNIX, and WINDOWS, which may include various software components and/or drivers for managing system tasks (e.g., memory management, storage device control, power management, etc.) and can communicate with hardware or software components to provide the operating environment for other software components. The service module 322 runs on the operating system 321, monitors the request from the network through the network service of the operating system 321, completes the corresponding data processing according to the request, and returns the processing result to the terminal. That is, the service module 322 is configured to provide network services to the terminal.

The network module 303 is configured to receive and transmit network signals. The above network signal may include a wireless signal or a wired signal. In one example, the above network signal is a wired network signal. At this point, the network module 303 may include a processor, a random access memory, a converter, a crystal oscillator, and the like.

First Embodiment

Figure 4:
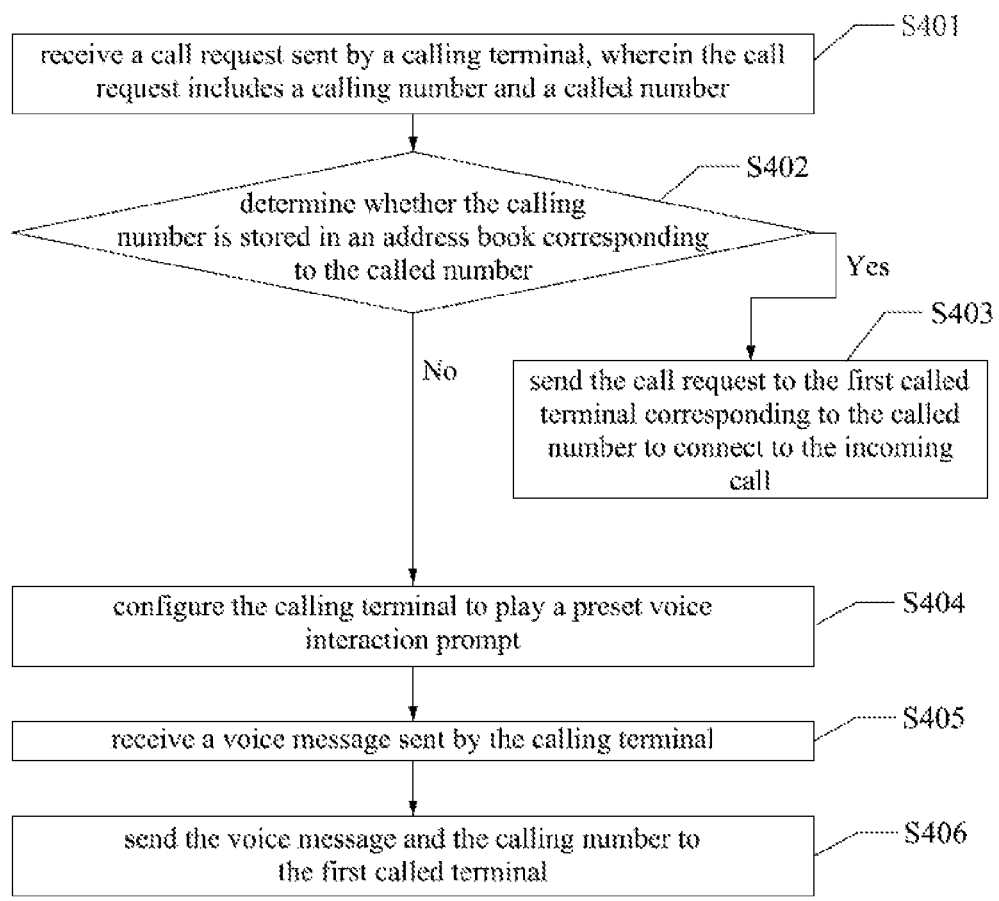
FIG. 4 is a flowchart of an incoming call management method according to a first embodiment of the present disclosure.

FIG. 4 is a flowchart of an incoming call management method according to a first embodiment of the present disclosure. This embodiment may be an incoming call management method performed by the server 300 through a network. As shown in FIG. 4, the incoming call management method in this embodiment may include the following steps:

Step S401: receive a call request sent by a calling terminal, wherein the call request includes a calling number and a called number;

Step S402: determine whether the calling number is stored in an address book corresponding to the called number;

Wherein, the address book corresponding to the called number may be, but not limited to, an address book stored locally in the first called terminal, but may also be, but not limited to, an address book uploaded to a cloud through the first called terminal.

If the calling number is stored in the address book, the process goes to step S403: send the call request to the first called terminal corresponding to the called number to connect to the incoming call;

If the calling number is not stored in the address book, the process goes to step S404: configure the calling terminal to play a preset voice interaction prompt, wherein the preset voice interaction prompt includes at least one of an input prompt of a calling user attribute and an input prompt of an incoming call reason;

Specifically, the voice interaction prompt may exist locally on the calling terminal or may exist in the cloud, and the voice interaction prompt is sent by the cloud to the calling terminal and then played.

Specifically, the calling user attribute may include, but are not limited to, at least one of a calling user's name, a calling user's identification number (ID) number, a calling user's work unit name and a calling user's occupation.

Specifically, but not limited to, the next input prompt is played after the voice message sent by the calling terminal for the last input prompt is received, so as to sequentially play a plurality of input prompts in the preset voice interaction prompt. For example, after playing the last input prompt such as an input prompt of the calling user's name, the calling terminal plays the next input prompt such as an input prompt of the user's ID number if the voice message such as Zhang San transmitted for the last input prompt is received. In an embodiment, a plurality of input prompts in a preset voice interaction prompt may be played at the same time, such as "Please speak your name and ID number."

Step S405: receive a voice message sent by the calling terminal;

Step S406: send the voice message and the calling number to the first called terminal.

According to the incoming call management method of the present disclosure, when a calling number is not in an address book, a preset voice interaction prompt including at least one of an input prompt of a calling user attribute and an input prompt of an incoming call reason is displayed so that the user can initially identify the calling number through the voice message, thereby improving the user experience.

Second Embodiment

Figure 5:
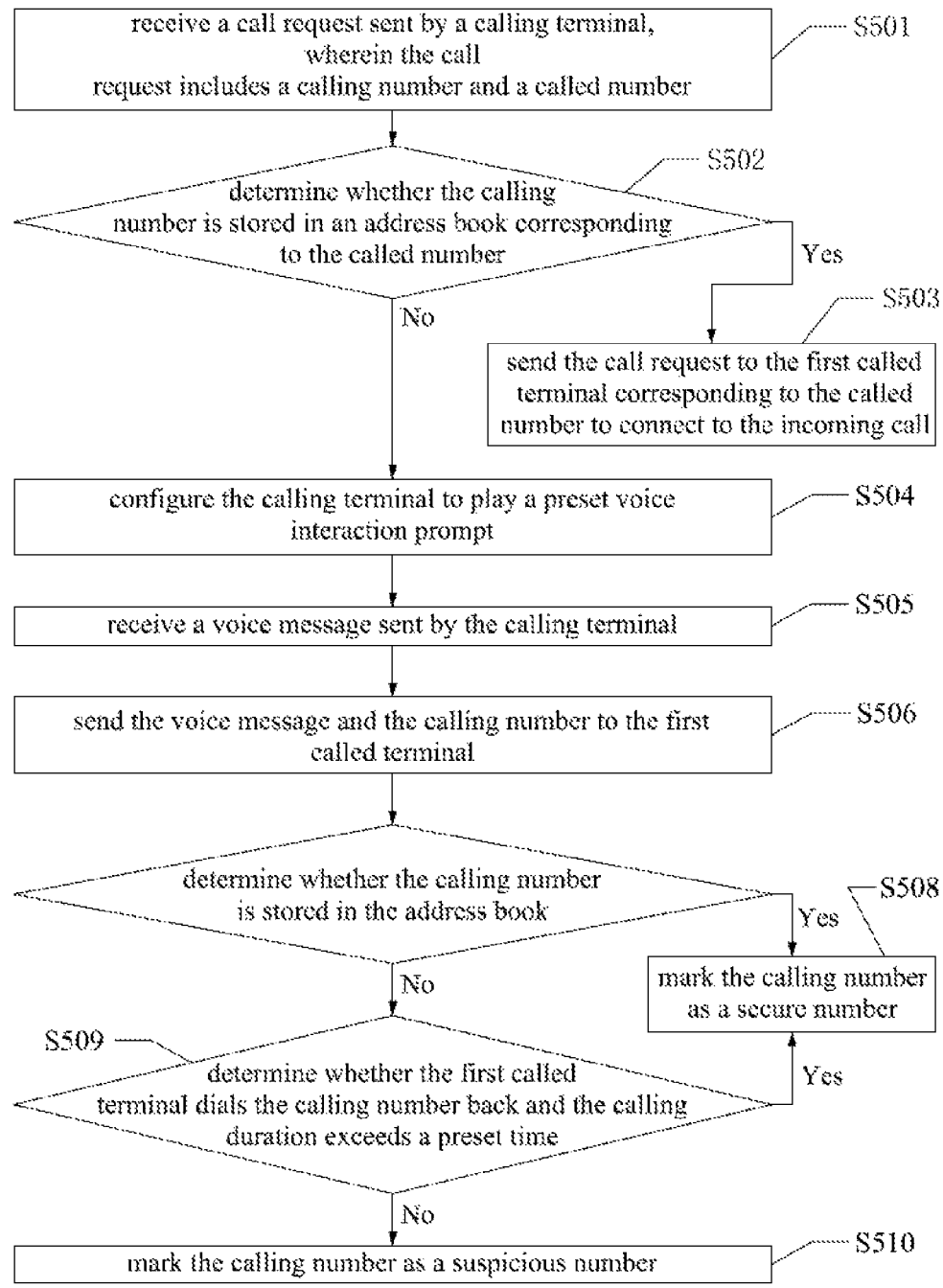
FIG. 5 is a flowchart of an incoming call management method according to a second embodiment of the present disclosure.

FIG. 5 is a flowchart of an incoming call management method according to a second embodiment of the present disclosure. As shown in FIG. 5, the incoming call management method in this embodiment may include the following steps:

Step S501: receive a call request sent by a calling terminal, wherein the call request includes a calling number and a called number;

Step S502: determine whether the calling number is stored in an address book corresponding to the called number;

Wherein, the address book corresponding to the called number may be, but not limited to, an address book stored locally in the first called terminal, but may also be, but not limited to, an address book uploaded to a cloud through the first called terminal.

If the calling number is stored in the address book, the process goes to step S503: send the call request to the first called terminal corresponding to the called number to connect to the incoming call;

If the calling number is not stored in the address book, the process goes to step S504: configure the calling terminal to play a preset voice interaction prompt, wherein the preset voice interaction prompt includes at least one of an input prompt of a calling user attribute and an input prompt of an incoming call reason;

Step S505: receive a voice message sent by the calling terminal;

Specifically, the method may include, but not are limited to, the following steps after step S505:

Determine whether the voice message sent by the calling terminal for each input prompt is received, that is, determine whether the calling user inputs for each input prompt;

If the voice message sent by the calling terminal for each input prompt is not received, the calling number is marked as a suspicious number and the process goes to step S506: send the voice message and the calling number to the first called terminal;

If the voice message sent by the calling terminal for each input prompt is received, the process directly goes to step S506: send the voice message and the calling number to the first called terminal.

Specifically, after receiving the voice message sent by the calling terminal for each input prompt, the voice message may be, but not limited to, verified. For example, if the voice message includes the name and the ID number, a matching is performed on the ID number with the name or the calling number. If the matching is unsuccessful, the calling number is marked as a suspicious number and the process goes to step S506: send the voice message and the calling number to the first called terminal. If the matching is successful, the process directly goes to step S506: send the voice message and the calling number to the first called terminal. In addition, the matching result may also be sent to the first called terminal together, so that the user can better identify a harassing phone call.

In an embodiment, the preset voice interaction prompt may also include, but is not limited to, an input prompt of called user attribute. The called user attribute includes at least one of a called user's name and a called user's work unit name. Specifically, after the step S505 of receiving a voice message sent by the calling terminal, the method may include, but is not limited to, the following steps:

Compare the voice message with a preset answer;

Specifically, the voice message is compared with the preset answer, that is, each item in the voice message is compared with a corresponding item in the preset answer. For example, the name of the called user in the voice message is compared with the preset called user's name, the occupation of the called user in the voice message is compared with the occupation of the called user in the preset answer, and the like.

If the comparison result is consistent, the process directly goes to step S506: send the voice message and the calling number to the first called terminal;

If the comparison result is inconsistent, the calling number is marked as a suspicious number and the process goes to step S506: send the voice message and the calling number to the first called terminal.

Specifically, but not limited to, the voice message sent by the calling terminal may be directly sent to the first called terminal. Or, but not limited to, after performing a speech identification on the voice message sent by the calling terminal, the corresponding voice message is converted into a text message and send to the first called terminal. In addition, but not limited to, the home location of the calling number is also sent to the first called terminal.

In an embodiment, specifically, after the step S505 of receiving a voice message sent by the calling terminal, the method may include, but is not limited to, the following steps:

Process and analyze the voice message to form a spectrum;

Determine whether the voice message has been processed by voice change according to the spectrum;

If the voice message has been processed by voice change, the calling number is marked as a suspicious number and the process goes to step S506: send the voice message and the calling number to the first called terminal;

If the voice message is not processed by voice change, the process directly goes to step S506: send the voice message and the calling number to the first called terminal.

In an embodiment, after the step S506 of sending the voice message and the calling number to the first called terminal, the method may further include, but is not limited to, the following steps:

Step S507: determine whether the calling number is stored in the address book;

If the calling number is stored in the address book, the process goes to step S508: mark the calling number as a secure number;

If the calling number is not stored in the address book, the process goes to S509: determine whether the first called terminal dials the calling number back and the calling duration exceeds a preset time;

If the first called terminal dials the calling number back and the calling duration exceeds the preset time, the process goes to step S508: mark the calling number as a secure number;

If the first called terminal does not call the calling number back or the calling duration does not exceed the preset time, the process goes to step S510: mark the calling number as a suspicious number.

It should be noted that the above description describes that after receiving the call request from the calling terminal corresponding to the calling number not stored in the address book, the calling number may be marked as a suspicious number by one or more of a variety of ways, for example, when the voice message sent by the calling terminal for each input prompt is not received and/or when the voice message has is processed by sound change and/or the comparison result between the voice message and the preset answer is inconsistent and/or the first called terminal does not dial the calling number back or the calling duration does not exceed the preset time. In an embodiment, but not limited to, when the calling number is marked as a suspicious number in any one of the above conditions or is marked as a suspicious number in a plurality of the above conditions, the number of times that the calling number is marked as a suspicious number is accumulated by one only, that is, the number of times that the calling number is marked as a suspicious number in each time the calling terminal corresponding to the calling number sends a call request is accumulated up by one, and this suspicious mark is removed if the calling number can be marked as a secure number. However, the present disclosure is not limited thereto, the number of times that the calling number may be, but not limited to, respectively marked as a suspicious number in a plurality of the above conditions. For example, if the voice message is processed by voice change, the number of times that the calling number is marked as a suspicious number is accumulated by one; and if the first called terminal does not dial the calling number back or the calling duration does not exceed the preset time, the number of times that the calling number is marked as a suspicious number is accumulated by one again.

In an embodiment, after the step S506 of sending the voice message and the calling number to the first called terminal, the method may further include, but is not limited to, the following steps:

Determine whether the cumulative number of times that the calling number is marked as a suspicious number exceeds a preset value;

If the cumulative number of times that the calling number is marked as a suspicious number does not exceed the preset value, set the risk level of the calling number to a low risk; and If the cumulative number of times that the calling number is marked as a suspicious number exceeds the preset value, set the risk level of the calling number to a medium risk or a high risk according to the consistency of the content of the voice message each time sent by the calling terminal corresponding to the calling number.

Specifically, for example but not limited to, the risk level of the calling number is set to a high risk when the tone color of the voice message each time sent by the calling terminal corresponding to the calling terminal or the calling user's name or the calling user's identification number in the voice message each time sent by the calling terminal corresponding to the calling number is inconsistent; or the risk level of the calling number is set to a medium risk when the calling user's occupation or the calling user's work unit name sent by the calling terminal corresponding to the calling number is inconsistent. For another example but not limited to, the risk level of the calling number is set to a medium risk when all the content in the voice message each time sent by the calling terminal corresponding to the calling number is consistent; or the risk level of the calling number is set to a high risk when the content of one item (e.g., name) in the voice message each time sent by the calling terminal corresponding to the calling number is inconsistent; and the like.

In an embodiment, the incoming call management method further includes: send the risk level of the calling number to a second called terminal. In an embodiment, the incoming call management method further includes: send, if the second called terminal dials back a calling number of a high-risk level, the voice message sent by the calling terminal corresponding to the calling number to a terminal associated with the second called terminal.

According to the incoming call management method of the present disclosure, when a calling number is not in an address book, a preset voice interaction prompt including at least one of an input prompt of a calling user attribute and an input prompt of an incoming call reason is displayed so that the user can initially identify the calling number through the voice message, thereby improving the user experience. In addition but not limited to, the voice message may be verified and/or analyzed and/or compared to mark the calling number as a suspicious number so as to further identify the calling number and further help the user to identify the harassing phone calls more quickly and accurately. In addition but not limited to, the calling number may be marked as a suspicious number according to user's behavior such as dialing the calling number back, storing the calling number into an address book, and the like, so as to further identify the calling number and further help the user to identify the harassing phone calls more quickly and accurately. In addition but not limited to, the calling number may be classified into different risk levels according to the number of times that the calling number is marked as a suspicious number and the consistency the content of the voice message each time sent by the calling terminal corresponding to the calling number, and the classified risk level is sent to other called terminal (second called terminal) for reference, thereby helping the user to identify the harassing phone calls more quickly and accurately.

Third Embodiment

Figure 6:
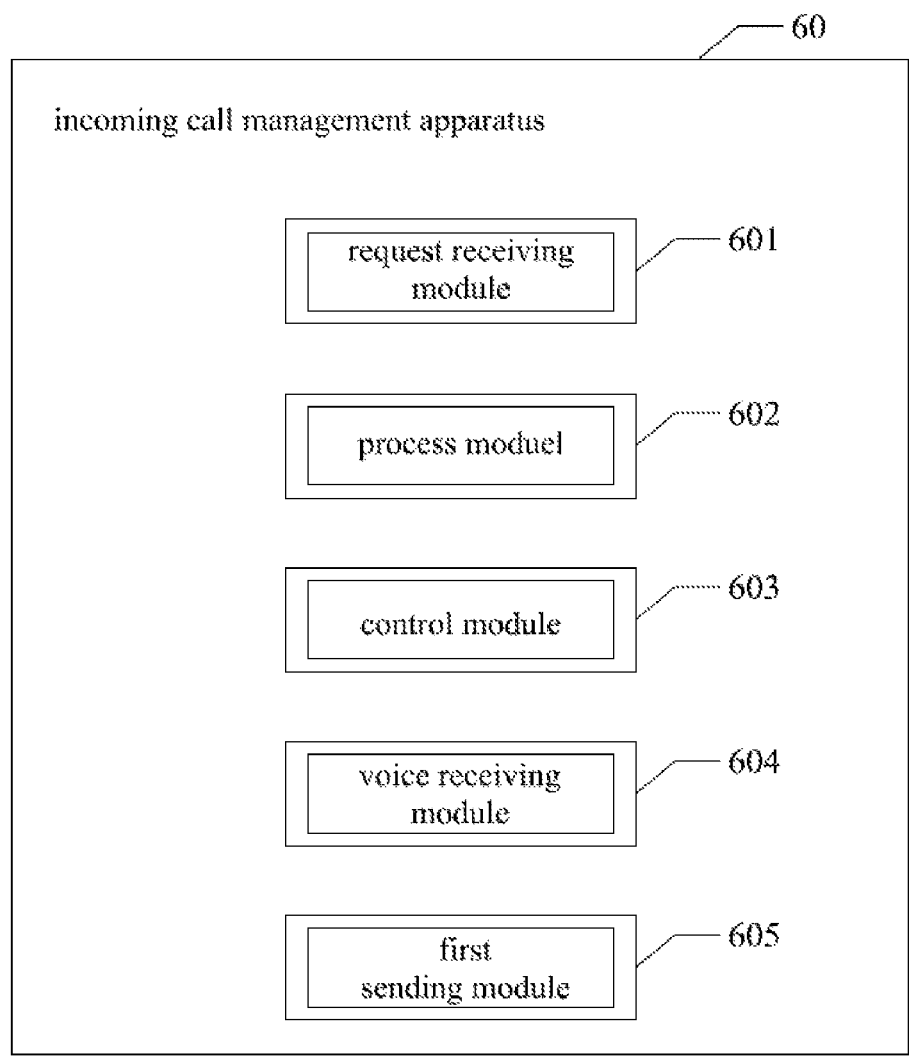
FIG. 6 is a schematic structural diagram of an incoming call management apparatus according to a third embodiment of the present disclosure.

FIG. 6 is a schematic structural diagram of an incoming call management apparatus according to a third embodiment of the present disclosure. As shown in FIG. 6, the incoming call management apparatus 60 includes a request receiving module 601, a processing module 602, a control module 603, a voice receiving module 604 and a first sending module 605.

The request receiving module 601 is configured to receive a call request sent by a calling terminal, wherein the call request includes a calling number and a called number. The processing module 602 is configured to send the call request to a first called terminal corresponding to the called number when the calling number is stored in an address book, so as to connect to the incoming call. The control module 603 is configured to control the calling terminal to play a preset voice interaction prompt when the calling number is not stored in the address book, wherein the preset voice interaction prompt includes at least one of an input prompt of a calling user attribute and an input prompt of an incoming call reason. The voice receiving module 604 is configured to receive a voice message sent by the calling terminal. The first sending module 605 is configured to send the voice message and the calling number to the first called terminal.

Fourth Embodiment

Figure 7:
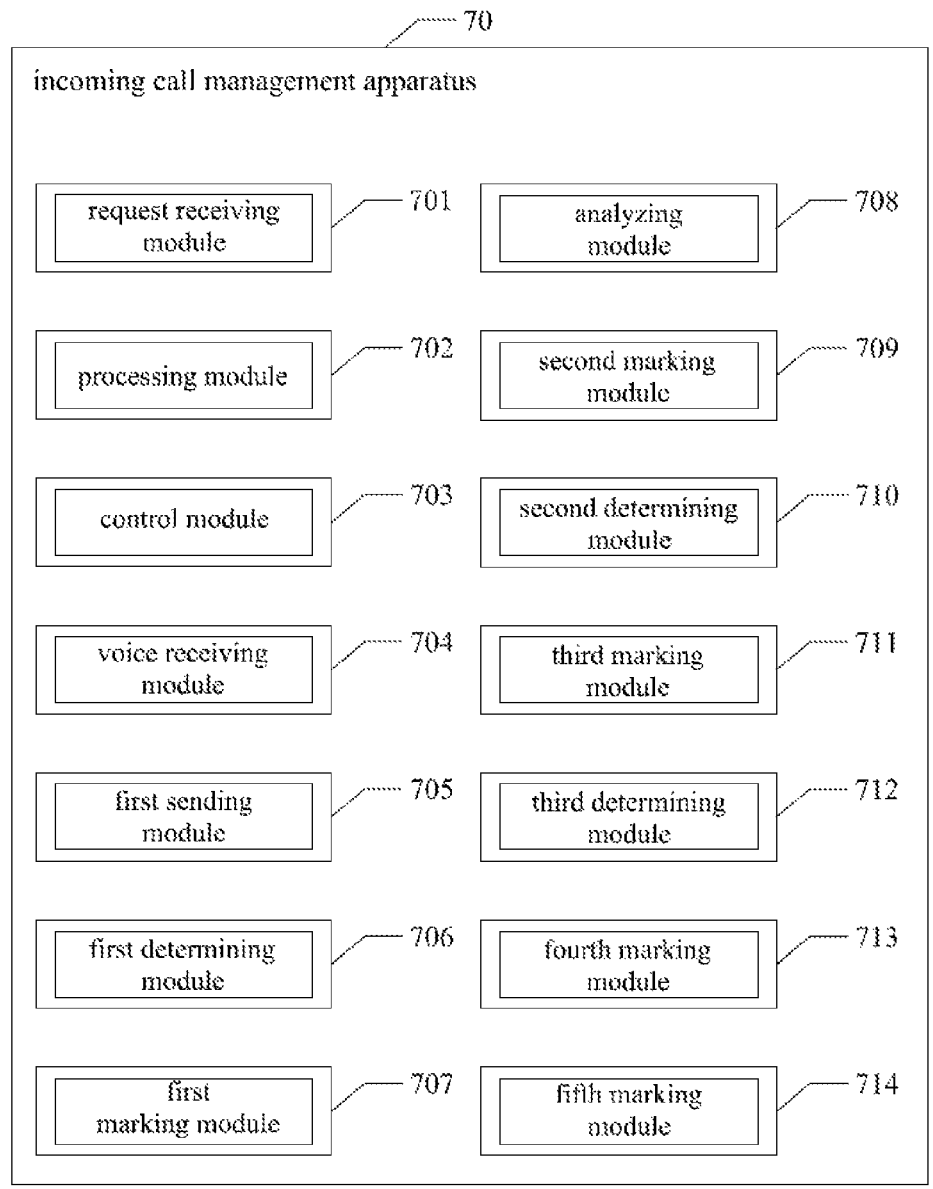
FIG. 7 is a schematic structural diagram of an incoming call management apparatus according to a fourth embodiment of the present disclosure.

FIG. 7 is a schematic structural diagram of an incoming call management apparatus according to a fourth embodiment of the present disclosure. As shown in FIG. 7, the incoming call management apparatus 70 includes a request receiving module 701, a processing module 702, a control module 703, a voice receiving module 704 and a first sending module 705.

In an embodiment, the control module 703 may, but is not limited to, further include a first control unit 703a. The first control unit 703a is configured to control the calling terminal to play the next input prompt after receiving the voice message sent by the calling terminal for the last input prompt, so as to sequentially play a plurality of input prompts in a preset voice interaction prompt.

In an embodiment, the incoming call management apparatus 70 may further include, but is not limited to, a first determining module 706 and a first marking module 707. The first determining module 706 is configured to determine whether the voice message sent by the calling terminal for each input prompt is received. The first marking module 707 is configured to mark the calling number as a suspicious number when the voice message sent by the calling terminal for each input prompt is not received.

In an embodiment, the incoming call management apparatus 70 may further include, but is not limited to, an analyzing module 708 and a second marking module 709. The analyzing module 708 is configured to process and analyze the voice message to form a spectrum, and determine whether the voice message has been processed by voice change according to the spectrum. The second marking module 709 is configured to mark the calling number as a suspicious number when the voice message has been processed by voice change.

In an embodiment, the incoming call management apparatus 70 may further include, but not limited to, a second determining module 710, a third marking module 711, a third determining module 712, a fourth marking module 713 and a fifth marking module 714. The second determining module 710 is configured to determine whether the calling number is stored in the address book. The third marking module 711 is configured to mark the calling number as a secure number when the calling number is stored in the address book. The third determining module 712 is configured to determine whether the first called terminal dials the calling number back and the calling duration exceeds a preset time when the calling number is not stored in the address book. The fourth marking module 713 is configured to mark the calling number as a secure number when the first called terminal dials the calling number back and the calling duration exceeds the preset time. The fifth marking module 714 is configured to mark the calling number as a suspicious number when the first called terminal does not dial the calling number back or the calling duration does not exceed the preset time.

In an embodiment, the incoming call management apparatus may further include, but is not limited to, a statistics module (not shown in the figure) and a risk level determining module (not shown in the figure). The statistics module is configured to determine whether the cumulative number of times that the calling number is marked as a suspicious number exceeds a preset value. The risk level determining module is configured to set the risk level of the calling number to a low risk when the cumulative number of times that the calling number is marked as a suspicious number does not exceed the preset value, and to set the risk level of the calling number to a medium risk or a high risk according to the consistency of the content of the voice message each time sent by the calling terminal corresponding to the calling number when the cumulative number of times that the calling number is marked as a suspicious number exceeds the preset value.

In an embodiment, the incoming call management apparatus may further include, but is not limited to, a second sending module (not shown in the figure). The second sending module is configured to send the risk level of the calling number to a second called terminal.

According to the incoming call management method and apparatus of the present disclosure, when a calling number is not in an address book, a preset voice interaction prompt including at least one of an input prompt of a calling user attribute and an input prompt of an incoming call reason is displayed so that the user can initially identify the calling number through the voice message, thereby improving the user experience.

It should be noted that each embodiment in this specification is described in a progressive manner, and each embodiment focuses on differences from other embodiments. The same or similar parts among the various embodiments can refer to each other. Since the device-type embodiments are basically similar to the method-type embodiments, the description thereof is relatively simple. For the relevant parts, reference may be made to the description of the method-type embodiments.

It should be noted that in this specification, the relational terms such as first and second are merely used to distinguish one entity or operation from another entity or operation without necessarily requiring or implying that any such actual relationship or sequence exists between these entities or operations. Also, the terms "comprise," "include," or any other variations thereof are intended to cover a non-exclusive inclusion such that a process, method, article, or apparatus that comprises a list of elements includes not only those elements but also other elements not expressly listed or other elements that are inherent to such process, method, article, or device. Without further limitations, an element limited by the phrase "including a . . . " does not exclude the existence of additional identical elements in the process, method, article, or apparatus that includes the element.

A person of ordinary skill in the art may understand that all or part of the steps of implementing the foregoing embodiments may be implemented by hardware may be implemented by instructing related hardware by a program. The program may be stored in a computer-readable storage medium. The above-mentioned storage medium may be a read only memory, a magnetic disk, an optical disk, or the like.

The foregoing is merely the preferred embodiments of the present disclosure but not intended to limit the present disclosure in any form. While the present disclosure has been described by the above preferred embodiments, it is to be understood that the present disclosure is not limited thereto. Anyone skilled in the art can make some equivalent modifications or alterations to equivalent embodiments without departing from the technical solution of the present disclosure. However, any simple modifications, equivalent changes and modifications made to the above embodiments according to the technical essence of the present disclosure without departing from the technical solutions of the present disclosure all fall within the scope of the technical solutions of the present disclosure.

What is claimed is:

1. An incoming call management method, wherein the incoming call management method comprises:
   receiving a call request sent by a calling terminal, wherein the call request comprises a calling number and a called number;
   determining whether the calling number is stored in an address book corresponding to the called number;
   if the calling number is stored in the address book, sending the call request to a first called terminal corresponding to the called number to connect to the incoming call;
   if the calling number is not stored in the address book, configuring the calling terminal to play a preset voice interaction prompt, wherein the preset voice interaction prompt comprises at least one of an input prompt of a calling user attribute and an input prompt of an incoming call reason;
   receiving a voice message sent by the calling terminal; and
   sending the voice message and the calling number to the first called terminal;
   wherein the incoming call management method further comprises setting a risk level of the calling number according to a consistency of a content of the voice message each time sent by the calling terminal corresponding to the calling number.

2. The incoming call management method according to claim 1, wherein the steps of configuring the calling terminal to play a preset voice interaction prompt and receiving a voice message sent by the calling terminal comprise:
after receiving the voice message sent by the calling terminal for the last input prompt, controlling the calling terminal to play the next input prompt so as to sequentially play a plurality of input prompts in the preset voice interaction prompt.

3. The incoming call management method according to claim 2, wherein after the step of receiving a voice message sent by the calling terminal, the method further comprises:
determining whether the voice message sent by the calling terminal for each input prompt is received;
if the voice message sent by the calling terminal for each input prompt is not received, marking the calling number as a suspicious number and entering the step of sending the voice message and the calling number to the first called terminal;
if the voice message sent by the calling terminal for each input prompt is received, directly entering the step of sending the voice message and the calling number to the first called terminal.

4. The incoming call management method according to claim 1, wherein after the step of receiving a voice message sent by the calling terminal, the method further comprises:
processing and analyzing the voice message to form a spectrum;
determining whether the voice message has been processed by voice change according to the spectrum;
if the voice message has been processed by voice change, marking the calling number as a suspicious number and entering the step of sending the voice message and the calling number to the first called terminal;
if the voice message is not processed by voice change, directly entering the step of sending the voice message and the calling number to the first called terminal.

5. The incoming call management method according to claim 1, wherein after the step of sending the voice message and the calling number to the first called terminal, the method further comprises:
determining whether the calling number is stored in the address book;
if the calling number is stored in the address book, marking the calling number as a secure number;
if the calling number is not stored in the address book, determining whether the first called terminal dials the calling number back and a calling duration exceeds a preset time;
if the first called terminal dials the calling number back and the calling duration exceeds the preset time, marking the calling number as a secure number; and
if the first called terminal does not dial the calling number back or the calling duration does not exceed the preset time, marking the calling number as a suspicious number.

6. The incoming call management method according to claim 5, wherein after the step of sending the voice message and the calling number to the first called terminal, the method further comprises:
determining whether a cumulative number of times that the calling number is marked as a suspicious number exceeds a preset value;
if the cumulative number of times that the calling number is marked as a suspicious number does not exceed the preset value, setting a risk level of the calling number to a low risk; and
if the cumulative number of times that the calling number is marked as a suspicious number exceed the preset value, setting the risk level of the calling number to a medium risk or a high risk according to a consistency of a content of the voice message each time sent by the calling terminal corresponding to the calling number.

7. The incoming call management method according to claim 6, wherein the calling user attribute comprises at least one of a calling user's name, a calling user's identification number, a calling user's work unit name and a calling user's occupation.

8. The incoming call management method according to claim 7, wherein the step of setting the risk level of the calling number to a medium risk or a high risk according to a consistency of a content of the voice message each time sent by the calling terminal corresponding to the calling number comprises:
setting the risk level of the calling number to a high risk when a tone color of the voice message each time sent by the calling terminal corresponding to the calling terminal or the calling user's name or the calling user's identification number in each sending is inconsistent; and/or
setting the risk level of the calling number to a medium risk when the calling user's occupation or the calling user's work unit name sent by the calling terminal corresponding to the calling number is inconsistent.

9. The incoming call management method according to claim 1, wherein the incoming call management method further comprises:
sending the risk level of the calling number to a second called terminal.

10. The incoming call management method according to claim 1, wherein the preset voice interaction prompt further comprises an input prompt of a called user attribute, the called user attribute comprises at least one of a called user's name and a called user's work unit name;
after the step of receiving a voice message sent by the calling terminal, the method further comprises:
comparing the voice message with a preset answer;
if a comparison result is consistent, directly entering the steps of sending the voice message and the calling number to the first called terminal;
if the comparison result is inconsistent, marking the calling number as a suspicious number and entering the step of sending the voice message and the calling number to the first called terminal.

11. A server, comprising a memory and a processor, wherein the processor is configured to running the software programs and modules stored in the memory to implementing the incoming call management method according to claim 1.

12. An incoming call management apparatus, wherein the incoming call management apparatus comprises:
a request receiving module, configured to receive a call request sent by a calling terminal, wherein the call request includes a calling number and a called number;
a processing module, configured to send the call request to a first called terminal corresponding to the called number when the calling number is stored in a address book, so as to connect to the incoming call;
a control module, configured to control the calling terminal to play a preset voice interaction prompt when the calling number is not stored in the address book, wherein the preset voice interaction prompt includes at least one of an input prompt of a calling user attribute and an input prompt of an incoming call reason;

a voice receiving module, configured to receive a voice message sent by the calling terminal;

a first sending module, configured to send the voice message and the calling number to the first called terminal;

a risk level determining module, configured to set the risk level of the calling number according to a consistency of a content of the voice message each time sent by the calling terminal corresponding to the calling number.

13. The incoming call management apparatus according to claim 12, wherein the control module comprises a first control unit, the first control unit is configured to control the calling terminal to play the next input prompt after receiving the voice message sent by the calling terminal for the last input prompt, so as to sequentially play a plurality of input prompts in the preset voice interaction prompt.

14. The incoming call management apparatus according to claim 13, wherein the incoming call management apparatus further comprises a first determining module and a first marking module;

the first determining module is configured to determine whether the voice message sent by the calling terminal for each input prompt is received;

the first marking module is configured to mark the calling number as a suspicious number when the voice message sent by the calling terminal for each input prompt is not received.

15. The incoming call management apparatus according to claim 12, wherein the incoming call management apparatus further comprises an analyzing module and a second marking module;

the analyzing module is configured to process and analyze the voice message to form a spectrum, and determine whether the voice message has been processed by voice change according to the spectrum;

the second marking module is configured to mark the calling number as a suspicious number when the voice message has been processed by voice change.

16. The incoming call management apparatus according to claim 12, wherein the incoming call management apparatus further comprises a second determining module, a third marking module, a third determining module, a fourth marking module and a fifth marking module;

the second determining module is configured to determine whether the calling number is stored in the address book;

the third marking module is configured to mark the calling number as a secure number when the calling number is stored in the address book;

the third determining module is configured to determine whether the first called terminal dials the calling number back and a calling duration exceeds a preset time when the calling number is not stored in the address book;

the fourth marking module is configured to mark the calling number as a secure number when the first called terminal dials the calling number back and the calling duration exceeds the preset time;

the fifth marking module is configured to mark the calling number as a suspicious number when the first called terminal does not dial the calling number back or the calling duration does not exceed the preset time.

17. The incoming call management apparatus according to claim 12, wherein the incoming call management apparatus further comprises:

a statistics module, wherein the statistics module is configured to determine whether the cumulative number of times that the calling number is marked as a suspicious number exceeds a preset value;

wherein, the risk level determining module, configured to set a risk level of the calling number to a low risk when the cumulative number of times that the calling number is marked as a suspicious number does not exceed the preset value and to set the risk level of the calling number to a medium risk or a high risk according to a consistency of a content of the voice message each time sent by the calling terminal corresponding to the calling number when the cumulative number of times that the calling number is marked as a suspicious number exceeds the preset value.

18. The incoming call management apparatus according to claim 17, wherein the incoming call management apparatus further comprises a second sending module, and the second sending module is configured to send the risk level of the calling number to a second called terminal.

* * * * *